Jan. 16, 1962 D. SIGMOND 3,017,235
MACHINE FOR SIMULTANEOUSLY PHOTOGRAPHING
A DOCUMENT AND THE BEARER
Filed Nov. 7, 1958 2 Sheets-Sheet 1
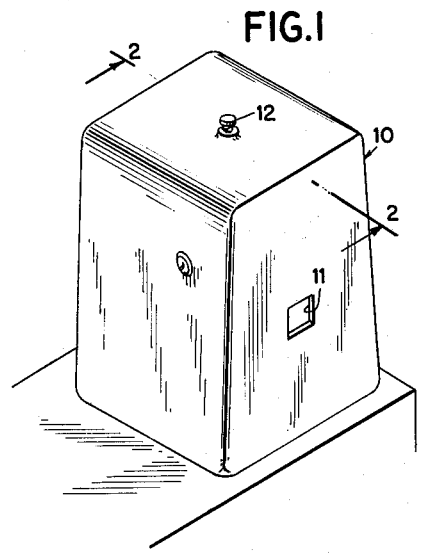
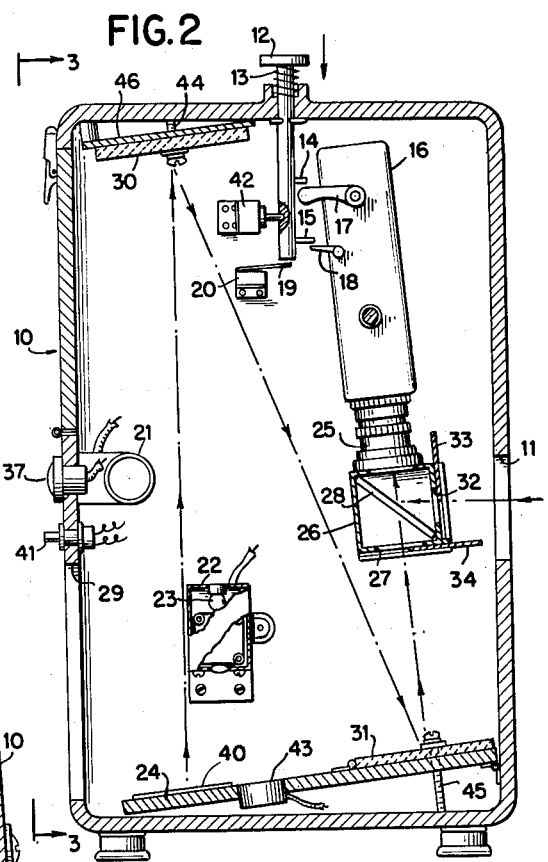
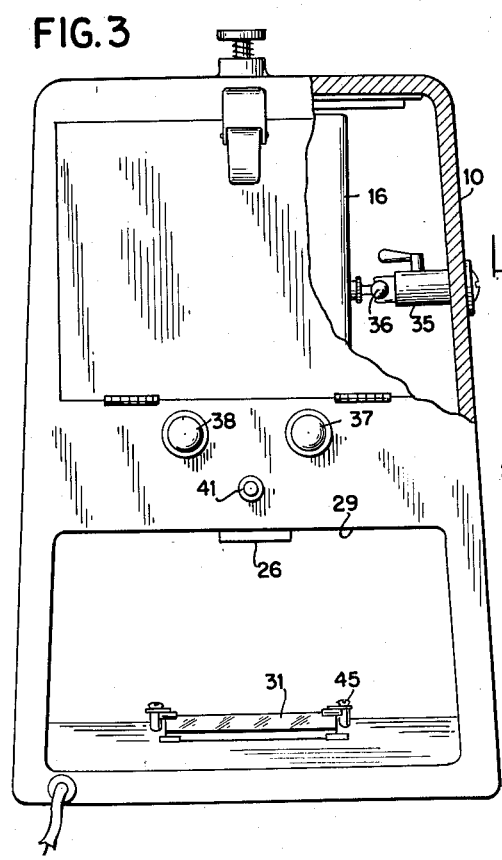
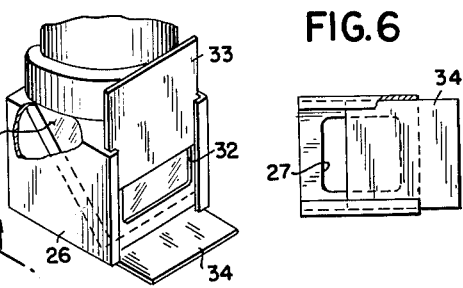
INVENTOR.
David Sigmond
BY *Albert F. Kronman*
ATTORNEY

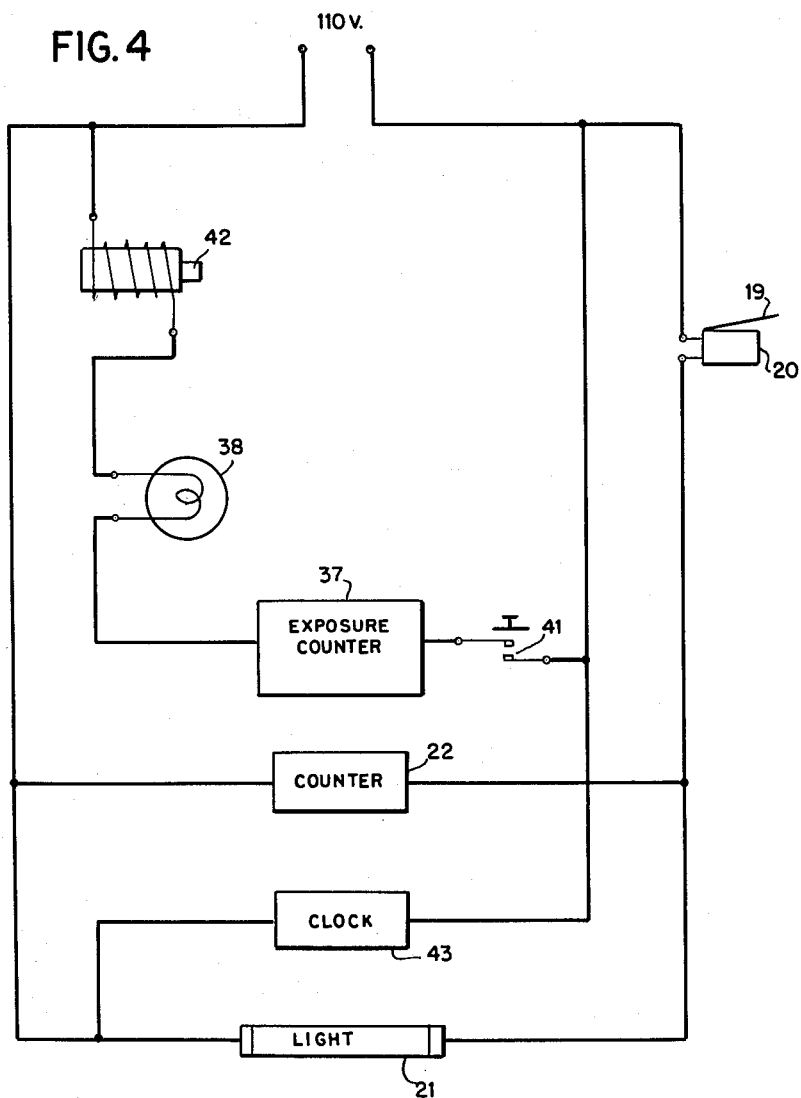

United States Patent Office 3,017,235
Patented Jan. 16, 1962

3,017,235
MACHINE FOR SIMULTANEOUSLY PHOTO-GRAPHING A DOCUMENT AND THE BEARER
David Sigmond, 46 Bay 43rd St., Brooklyn, N.Y.
Filed Nov. 7, 1958, Ser. No. 772,431
6 Claims. (Cl. 346—107)

This invention relates to a device for simultaneously photographing a document and a person, and is specifically directed to a means for identifying by a photograph, a person who cashes a check, reports for work or seeks admission to a restricted area.

Where a large number of checks are cashed it is often important to make a record of the person seeking to cash the check. Such a record aids in the apprehension of people who pass bad checks and also individuals who attempt to cash checks when they are not authorized to do so. Identification of persons presenting themselves for other purposes is often essential.

Accordingly, it is an object of the present invention to provide a device whereby a check or other document may be photographed and at the same time the person seeking to negotiate the instrument will also be photographed.

Another object of the present invention is to provide a device which will record by means of a number, time, date and the like, the details of a check cashing or other transaction.

A further object of the present invention is to provide a device which will count the number of checks which are cashed during a given interval of time.

A still further object of the present invention is to provide a check or document photographing device which will occupy a minimum amount of space and which may be mounted on a table or counter with ease.

A feature of the present invention is its use of a partially silvered mirror, whereby the image of the check and the casher thereof may be superimposed upon the same film.

Another feature of the present invention is its numbering mechanism for imposing upon the check or document a serial number or other information.

A further feature of the present invention is its compact design which lends portability to the device.

Another feature of the present invention is its use of shields whereby the size of the respective images projected upon the camera film may be governed.

Still another feature of the present invention is its trip means whereby the camera is operated together with the counting means and the film marking device, all in one operation.

The invention consists of the construction, combination and arrangement of parts, as herein illustrated, described and claimed.

In the accompanying drawings, forming a part hereof is illustrated one form of embodiment of the invention and in which:

FIGURE 1 is a view in perspective showing a complete embodiment of the present invention.

FIGURE 2 is a vertical section taken on line 2—2 in FIGURE 1, looking in the direction of the arrows on a somewhat enlarged scale.

FIGURE 3 is a view in rear elevation of the device shown in FIGURES 1 and 2 in accordance with the present invention.

FIGURE 4 is a wiring diagram of the electrical elements used in the present device.

FIGURE 5 is a fragmentary detailed view of the mirror and shield arrangement attached to the front of the camera lens in accordance with the present invention on a somewhat enlarged scale.

FIGURE 6 is a bottom plan view of the structure shown in FIGURE 4.

Referring to the drawings, and particularly to FIGURES 1 and 2, 10 indicates a hollow housing or casing having an aperture 11 in the front face thereof. An actuating plunger 12 is provided in the top of the housing 10, by means of which the photographing device may be set in operation. The plunger 12 extends through the housing 10 and into the interior as shown in FIGURE 2. A coil spring 13 is disposed around the plunger 12 to return it to its original position after each operation. The plunger 12 is provided with detents 14, 15, which extend laterally therefrom to engage the camera film transport lever 17, and the shutter trip 18, respectively. The bottom of the plunger 12 overlies a switch arm 19, so that when the plunger is depressed, the switch 20 will be tripped to energize a light 21, and an item counter 22.

The counter 22 is provided with a small light 23, which projects the legend within the counter body onto the table 24. The light falling upon the table 24 is recorded upon the film of the camera 16 in a hereinafter described manner, and the legend within the counter 22 is therefore photographed each time the device is operated.

The camera 16 has secured to the lens 25, thereof, a small enclosure 26. The enclosure 26 is somewhat box-like as shown in FIGURE 5 and is provided with a bottom opening 27, and a sheet of glass 28 or other transparent material having a partially silvered mirror upper surface thereon diagonally mounted therein. The partially silvered mirror 28 is disposed in the path of the light entering the enclosure 26 through the bottom opening 27 and through the aperture 32 in the front thereof.

When it is desired to photograph a check, document or the like, and a person at the same time, the operator places the check 40 within the housing 10 by inserting it through the opening 29, in the rear of the housing 10. The check is placed upon the table 24. A safety switch 41 located at the back of the housing 10 is closed to release the solenoid operated lock 42. A warning light 38 will then indicate that the camera is ready for exposure. With the person to be photographed standing in front of the front aperture 11, the plunger 12 is depressed.

As the plunger 12 descends, it trips the camera shutter 18 and energizes the main light source 21, and the light 23 within the counter 22.

Light from the check is reflected to the front surface mirror 30, secured to the top of the housing 10 and then downwardly to a second front surface mirror 31, disposed upon the table 24 below the camera 16. Light from the counter 22 is also projected downwardly upon the table 24 and directed at the camera 16 by means of the mirrors 30, 31. In addition, the clock 43 may also be photographed with the document.

The light leaving mirror 31 traverses the partially silvered mirror 28 within the box-like enclosure 26, attached to the lens 25. Light coming from the person standing in front of the aperture 11 enters a small window 32 in the side wall of the box-like enclosure 26, and is reflected by the partially silvered upper face of mirror 28 upwardly and into the camera 16. A shield 33 is slidably carried by the side wall of the enclosure 26, adjacent to the openings 32, so that the size of the said opening may be regulated as desired. A second shield 34 is carried on the bottom of the enclosure 26 for the purpose of regulating the size of the opening 27 therein. By means of the shields 33, 34, a portion of the field of the openings 11, 29, can be screened off from the camera so that the film in the camera 16 will receive on one portion thereof, the image of the check, the clock and the projected legend from the counter 22, and on the other portion thereof the image of the person to be photographed. In this manner, a side by side photograph of the document and the person will be produced upon the film simultaneously.

As shown in FIGURE 3, the camera 16 is secured to the housing 10 by means of an arm 35 having an adjustable socket 36 thereon for retaining the camera 16 in any desired position.

After the plunger 12 has been pushed downwardly to take the picture it may be released. On the upward travel of the plunger 12 the detent 14 will encounter the film transport arm 17, to move the film within the camera 16, a distance corresponding to one frame thereof.

A film exposure counter 37 may also be mounted on the rear panel of the housing 10 to advise the operator of how many exposures remain in the magazine of the camera 16. The film exposure counter 37 is actuated each time the switch 41 is closed.

The mirrors 30, 31, are adjustable by means of screws 44, 45, carried by the mirror support 46 and table 24, respectively. The images reflected from the mirrors 30, 31, thus may be directed into the camera lens 25.

While the description has heretofore referred to the counter 22 as an item counter it is to be understood that any information such as serial numbers, identification numbers or the like, may be projected on to the document by means of this device.

From the foregoing it will be seen that there has been provided a machine for quickly photographing a document and the person presenting it which may be set up on a table or a counter with a minimum of difficulty and operated with ease. The device is entirely self-contained and is therefore portable. In addition, the apparatus is adjustable to accommodate documents of various sizes and the photographing of a wide variety of information at the same time as the picture of the person is taken.

Having thus fully described the invention, what is claimed as new and desired to be secured by Letters Patent of the United States is:

1. A device for simultaneously photographing a document and a person comprising, a hollow housing, a light receiving opening in the front of said housing, a document receiving opening in the back of said housing, a document receiving table adjacent the rear opening and within the housing, a first mirror within the housing to receive light coming from the table, a second mirror within the housing to receive light coming from the first mirror, a camera carried within the housing and positioned to receive light reflected by the second mirror, box-like enclosure within the housing between the camera and second mirror, a first opening in the enclosure to admit light coming through the front opening of the housing, a second opening in the enclosure to receive light coming from the second mirror, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a switch in the housing adjacent the plunger, a light source responsive to the switch, said light source being connected to a source of electrical potential through the switch and means responsive to the sliding action of the plunger to close the switch, illuminate the document on the table and operate the camera to simultaneously photograph the document and record the image reflected and transmitted by the partially silvered mirror.

2. A device for simultaneously photographing a document and a person comprising, a hollow housing, a light receiving opening in the front of said housing, a document receiving opening in the back of said housig, a document receiving table adjacent the rear opening and within the housing, a first mirror within the housing to receive light coming from the table, a second mirror within the housing to receive light coming from the first mirror, a camera carried within the housing and positioned to receive light reflected by the second mirror, box-like enclosure within the housing between the camera and second mirror, a first opening in the enclosure to admit light coming through the front opening of the housing, a shield slidably carried by the enclosure adjacent the first opening, a second opening in the enclosure to receive light coming from the second mirror, a shield slidably carried by the enclosure adjacent the second opening, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a switch in the housing adjacent the plunger, a light source responsive to the switch, said light source being connected to a source of electrical potential through the switch and means responsive to the sliding action of the plunger to close the switch, illuminate the document on the table and operate the camera to simultaneously photograph the document and record the image reflected and transmitted by the partially silvered mirror.

3. A device for simultaneously photographing a document and a person comprising, a hollow housing, a light receiving opening in the front of said housing, a document receiving opening in the back of said housing, a document receiving table adjacent the rear opening and within the housing, a counter supported within the housing to impose selected information on the table, a first mirror within the housing to receive light coming from the table, a second mirror within the housing to receive light coming from the first mirror, a camera carried within the housing and positioned to receive light reflected by the second mirror, box-like enclosure within the housing between the camera and second mirror, a first opening in the enclosure to admit light coming through the front opening of the housing, a second opening in the enclosure to receive light coming from the second mirror, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a switch in the housing adjacent the plunger, a light source responsive to the switch, said light source being connected to a source of electrical potential through the switch and means responsive to the sliding action of the plunger to close the switch, illuminate the document on the table and operate the camera to simultaneously photograph the document, the information of the counter, and record the image reflected and transmitted by the partially silvered mirror.

4. A device for simultaneously photographing a document and a person comprising, a hollow housing, a light receiving opening in the front of said housing, a document receiving opening in the back of said housing, a document receiving table adjacent the rear opening and within the housing, a first mirror within the housing to receive light coming from the table, means to adjust the angular disposition of said first mirror, a second mirror within the housing, means to adjust the angular disposition of said second mirror to receive light coming from the first mirror, a camera carried within the housing and positioned to receive light reflected by the second mirror, box-like enclosure within the housing between the camera and second mirror, a first opening in the enclosure to admit light coming through the front opening of the housing, a second opening in the enclosure to receive light coming from the second mirror, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a switch in the housing adjacent the plunger, a light source responsive to the switch, said light source being connected to a source of electrical potential through the switch and means responsive to the sliding action of the plunger to close the switch, illuminate the document on the table and operate the camera to simultaneously photograph the document and record the image reflected and transmitted by the partially silvered mirror.

5. A device for simultaneously photographing a document and a person comprising, a hollow housing, a light receiving opening in the front of said housing, a document receiving opening in the back of said housing, a document receiving table adjacent the rear opening and within the housing, a first mirror within the housing to receive light coming from the table, a second mirror within the housing to receive light coming from the first mirror, a camera within the housing and positioned to receive light reflected by the second mirror, box-like enclosure within the housing between the camera and second mirror, a first opening in the enclosure to admit light coming through the front opening of the housing, a second opening in the enclosure to receive light coming from the second mirror, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a solenoid adjacent said plunger, an arm carried by the solenoid and engageable with the plunger to lock it in place, a safety switch on said housing, said safety switch being connected between a source of potential and the solenoid, a switch in the housing adjacent the plunger, a light source responsive to the plunger switch, said light source being connected to a source of electrical potential through the switch and means responsive to the sliding action of the plunger to close the switch, illuminate the document on the table and operate the camera to simultaneously photograph the document and record the image reflected and transmitted by the partially silvered mirror.

6. A device for simultaneously photographing a document and a person comprising, a hollow housing, a light receiving opening in the front of said housing, a document receiving opening in the back of said housing, a document receiving table adjacent the rear opening and within the housing, a counter supported within the housing to impose selected information on the table, a first mirror within the housing to receive light coming from the table, means to adjust the angular disposition of said first mirror, a second mirror within the housing, means to adjust the angular disposition of said second mirror to receive light coming from the first mirror, a camera carried within the housing and positioned to receive light reflected by the second mirror, box-like enclosure within the housing between the camera and second mirror, a first opening in the enclosure to admit light coming through the front opening of the housing, a shield slidably carried by the enclosure adjacent the first opening, a second opening in the enclosure to receive light coming from the second mirror, a shield slidably carried by the enclosure adjacent the second opening, and a third opening in the enclosure adjacent the camera to permit light to leave the enclosure and enter the camera, a partially silvered mirror diagonally disposed in the enclosure between the first and second openings with its reflective side toward the front opening of the housing to direct light coming therethrough into the camera, a plunger slidably carried by the housing and extending inwardly thereof, a solenoid adjacent said plunger, an arm carried by the solenoid and engageable with the plunger to lock it in place, a safety switch on said housing, said switch being connected between a source of potential and the solenoid, a switch in the housing adjacent the plunger, a light source responsive to the switch, said light source being connected to a source of electrical potential through the switch and means responsive to the sliding action of the plunger to close the switch, illuminate the document on the table and operate the camera to simultaneously photograph the document, the information of the counter, and record the image reflected and transmitted by the partially silvered mirror.

References Cited in the file of this patent

UNITED STATES PATENTS

| | | |
|---|---|---|
| 1,094,073 | Ilg | Apr. 21, 1914 |
| 1,237,808 | Ottinger | Aug. 21, 1917 |
| 2,060,963 | Van Degrift | Nov. 17, 1936 |
| 2,250,442 | Abell | July 29, 1941 |
| 2,278,357 | Madden | Mar. 31, 1942 |
| 2,394,225 | Ashford | Feb. 5, 1946 |
| 2,433,129 | Land | Dec. 23, 1947 |
| 2,537,040 | Doyle et al. | Jan. 9, 1951 |
| 2,736,630 | Cooper | Feb. 28, 1956 |
| 2,927,515 | Simjian | Mar. 8, 1960 |